Patented Nov. 8, 1927.

1,648,262

UNITED STATES PATENT OFFICE.

JOHN G. G. FROST, OF CLEVELAND, OHIO, ASSIGNOR TO THE NATIONAL SMELTING COMPANY, OF CLEVELAND, OHIO, A CORPORATION OF OHIO.

PROCESS OF TREATING ALUMINUM SCREENINGS, ETC.

No Drawing. Application filed July 28, 1924, Serial No. 728,574. Renewed August 20, 1927.

My invention relates to a process of recovering aluminum and other valuable and useful products from aluminous materials, and more particularly to recovering aluminum and aluminum compounds present in skimmings, dross or analogous aluminous materials from aluminum foundries, aluminum smelters and the like.

In present practice the larger particles of metallic aluminum, or its alloys, and of iron or other metals are first removed from this material by any of the well known mechanical processes, such as passing the material over a magnet, screening it, etc. The residue from the screening operation in such separation comprises what may be termed for convenience "dross screenings" and this consists of the finely divided material from which all the metallic aluminum has been recovered that it is possible to recover on a commercial basis with present processes.

Such dross screenings consist mainly of fine particles of metallic aluminum or its alloys, metallic iron, oxides of aluminum, copper, iron, zinc and other metals, as well as nitrides, carbides and other miscellaneous compounds and metals, all of which have contributed to prevent successful recovery on a commercial basis of valuable products of aluminum and other valuable and useful products. Usually these dross screenings contain about 50% to 75% of aluminum content figured as aluminum oxide ($Al_2O_3$).

In carrying out my invention the dross screenings are treated with sulphur dioxide and water which acts as a solvent and causes a large portion of the aluminum to form a soluble compound, probably aluminum sulphite of more or less complex composition but which for purposes of this description will be termed aluminum sulphite. This sulphite may be separated from the residue by filtration and subsequently treated as will be explained to obtain aluminum hydroxide free from iron.

In order to treat the dross screenings with sulphur dioxide, it is desirable to place the material in a suitable vessel with considerable water where it can be thoroughly agitated.

Preferably the dross screenings are placed in a revolving drum with three or four times as much water, and sulphur dioxide is supplied thereto. This reaction is preferably carried out at room temperature as the reaction itself evolves heat and it is more convenient to have a minimum amount of heat and pressure developed in the drum because less expensive apparatus is required than when sulphur dioxide is formed or supplied under relatively high pressure.

This treatment in the drum causes a large part of the aluminum and substantially all of the iron and zinc in the dross screenings to be dissolved and held in solution as aluminum sulphite and iron and zinc sulphites.

There is usually a sufficient amount of metallic aluminum in the dross screenings to cause any copper which forms copper sulphite in this reaction to be deposited as metallic copper upon the aluminum particles. When so deposited, the metallic copper does not react further with the sulphur dioxide to form further sulphites. Consequently the copper does not remain in solution if there be sufficient metallic aluminum present in the material being treated in the drum.

After the treatment in the drum with the sulphur dioxide and water the solution is separated from the solid material, preferably by filtration, although other means may be employed. The residue from this reaction may be treated to recover more aluminum as will be hereinafter described. The filtrate from the sulphiting reaction is treated to cause the aluminum compound to be desulphited and aluminum hydroxide precipitated, the iron and zinc remaining in solution.

Preferably the treatment of the filtrate is carried out by boiling the solution in a suitable closed vessel, although it is known that the reaction can be carried out at lower temperatures when the solution is vigorously agitated.

If any copper sulphite is present in the solution to be desulphited due to the fact that there was not sufficient metallic aluminum in the dross screenings to remove the copper in the first reaction, such copper sulphite can be removed by the addition of a small amount of metallic aluminum to the liquor to be desulphited. Any zinc or iron sulphites that are present in the solution to be desulphited are not affected by the normal boiling or agitating necessary to carry out the precipitation of the aluminum hydroxide, and therefore they can be separated from the aluminum hydroxide because they pass into the filtrate. In this reaction an excess of heating or boiling and agitating is to be avoided as it is liable to cause breaking down of the iron or zinc sulphites and the consequent precipitation of compounds of these metals which would render the aluminum hydroxide impure. The sulphur dioxide gas resulting from this reaction can be recovered and used again in the treatment of more dross screenings. The aluminum hydroxide resulting from this reaction is substantially pure, being free from iron and zinc, and, as is well known, is a valuable commercial product to form many desired aluminum products.

By the sulphiting and desulphiting reaction from 40% to 50% or more of the aluminum in the dross screenings can be recovered, the amount depending upon the quality and conditions of the dross screenings and whether they have been previously subjected to too high temperatures. The aluminum not removed from the dross screenings by the sulphiting process can be largely recovered by treating the residue remaining after the first reaction described above with concentrated sulphuric acid which forms aluminum sulphate. This can be evaporated and purified by present processes from the copper and iron sulphates if they be present to obtain substantially pure aluminum sulphate in solid form. It will be noted that this residue resulting from the sulphiting reaction has substantially all the zinc and iron removed so that it can be readily treated with sulphuric acid to form the aluminum sulphate without forming an excess of the objectionable iron and zinc sulphates.

The residue from the sulphiting reaction, of course, can be treated to form aluminum chloride or other salts or compounds so that a large percentage of the aluminum remaining after the sulphiting operation can be recovered in the form of valuable products.

It will thus be seen that by my process I can obtain valuable commercial products of aluminum from dross screenings and this has previously been unsuccessful on a commercial basis. At the present time it is common practice in many smelters to go to the expense of transporting this material to some suitable dumping ground. By the use of my process, however, the hitherto troublesome impurities occuring in dross screenings which have prevented the successful recovery of the majority of the aluminum, are removed and a large percentage of the aluminum is recovered.

Furthermore, it is to be understood that the particular compounds disclosed, and the procedure set forth, are presented for purposes of explanation and illustration and that various equivalents can be used and modifications of said procedure can be made without departing from my invention as defined in the appended claims.

What I claim is:

1. The method of recovering the aluminum and aluminum compounds present in dross screenings and the like which consists in subjecting the screenings to treatment with sulphur dioxide and water, separating the solution from the residue and desulphiting the solution to obtain aluminum hydroxide.

2. The method of recovering the aluminum and aluminum compounds present in dross screenings and the like which comprises subjecting the screenings to treatment with sulphur dioxide and water to form soluble salts of a large percentage of the aluminum and substantially all the iron and zinc in the screenings, separating the solution from the solid material and desulphiting the solution to precipitate aluminum hydroxide without precipitating the iron and zinc sulphite.

3. The method of recovering the aluminum and aluminum compounds present in dross screenings and the like which consists in subjecting them to treatment with sulphur dioxide and water, providing sufficient metallic aluminum to prevent copper sulphite remaining in solution during this treatment, and precipitating the aluminum sulphite from the sulphite solution as aluminum hydroxide.

4. The method of recovering the aluminum and aluminum compounds present in dross screenings and the like which comprises subjecting the screenings to treatment with sulphur dioxide and water to form soluble salts of a large percentage of the aluminum and substantially all the iron and zinc in the screenings, filtering and desulphiting the solution by sufficient heating and agitating to precipitate aluminum hydroxide without causing the iron and zinc sulphites to be precipitated.

5. The method of recovering aluminum and aluminum compounds present in dross screenings and the like which comprises subjecting the screenings to treatment with sulphur dioxide and water to dissolve a large percentage of the aluminum and substantially all the iron and zinc in the screenings, separating the solution from the solid material and desulphiting the solution to precipitate aluminum hydroxide without precipitating the iron and zinc sulphite, and separating the precipitated aluminum hydroxide from the solution of iron and zinc sulphite.

In testimony whereof, I hereunto affix my signature.

JOHN G. G. FROST.